US012460458B2

(12) United States Patent
Finley

(10) Patent No.: US 12,460,458 B2
(45) Date of Patent: Nov. 4, 2025

(54) REMOVABLE, NON-INTRUSIVE, REMOTELY-CONTROLLED DOOR LOCKING APPARATUS

(71) Applicant: Kenneth Finley, Arlington, VA (US)

(72) Inventor: Kenneth Finley, Arlington, VA (US)

( * ) Notice: Subject to any disclaimer, the term of this patent is extended or adjusted under 35 U.S.C. 154(b) by 118 days.

(21) Appl. No.: 18/458,002

(22) Filed: Aug. 29, 2023

(65) Prior Publication Data

US 2024/0068282 A1 Feb. 29, 2024

Related U.S. Application Data

(60) Provisional application No. 63/373,898, filed on Aug. 30, 2022.

(51) Int. Cl.
*E05C 19/00* (2006.01)
*E05B 45/06* (2006.01)
*E05B 47/00* (2006.01)

(52) U.S. Cl.
CPC ...... *E05C 19/005* (2013.01); *E05B 2045/063* (2013.01); *E05B 2045/065* (2013.01); *E05B 2047/0016* (2013.01); *E05B 2047/0048* (2013.01); *E05B 2047/0095* (2013.01)

(58) Field of Classification Search
CPC ............. E05C 19/005; E05B 2045/063; E05B 2045/065; E05B 2047/0016; E05B 2047/0048; E05B 2047/0095
See application file for complete search history.

(56) References Cited

U.S. PATENT DOCUMENTS

| | | | |
|---|---|---|---|
| 217,762 A | 7/1879 | Witte | |
| 534,017 A | 2/1895 | Snedeker | |
| 3,124,382 A | 3/1964 | Strother | |
| 3,829,834 A | 8/1974 | Frankland et al. | |
| 3,989,286 A | 11/1976 | Cleff | |
| 4,019,765 A | 4/1977 | Nichola | |
| 4,442,427 A | 4/1984 | Morton | |
| 4,483,558 A | 11/1984 | Van Meter | |
| 4,607,253 A | 8/1986 | Wooten et al. | |
| 4,883,297 A | 11/1989 | Smith | |
| 4,971,374 A | 11/1990 | Lovell et al. | |
| 4,973,093 A | 11/1990 | Olszowka | |

(Continued)

FOREIGN PATENT DOCUMENTS

| | | | | |
|---|---|---|---|---|
| KR | 101282085 B1 | 7/2013 | | |
| WO | 2014056109 A1 | 4/2014 | | |
| WO | WO-2016057578 A1 * | 4/2016 | ............. | E05B 45/06 |

*Primary Examiner* — Mark A Williams

(57) ABSTRACT

In order to secure a door in a locked position without a key, such as to resist a forced entry through the door, a removable, non-intrusive, remotely-controlled door locking apparatus is provided, which includes a rear plate for attachment against a surface of a door using an adhesive substance, a flange that extends from the rear plate under the door, and a cover for enclosing components on the rear plate. A DC-powered linear actuator connected to the rear plate and at least one electronics module configured to communicate wirelessly is within the cover. A foot of the actuator is configured to be extended in a lock state against a floor surface to secure the door or retracted in an unlock state, based on either a wireless signal received from a remote smart device or the state of a manual switch located on apparatus to control the actuator.

19 Claims, 4 Drawing Sheets

(56) References Cited

U.S. PATENT DOCUMENTS 5,216,909 A 6/1993 Armoogam
5,250,927 A * 10/1993 Nevels .................. G08B 13/08 200/61.93
5,392,026 A 2/1995 Marik
5,618,072 A 4/1997 Pitchford
5,725,263 A 3/1998 Rodriguez
5,971,450 A 10/1999 Suarez
5,988,710 A 11/1999 Kortschot et al.
6,116,067 A 9/2000 Myers et al.
6,557,915 B1 5/2003 Duff
6,580,355 B1 * 6/2003 Milo .................. E05B 47/0012 70/277
D504,301 S 4/2005 Wood
7,021,683 B2 4/2006 Nissen
7,096,698 B2 8/2006 Walsh, III et al.
7,164,356 B1 * 1/2007 Zeitz ..................... G08B 13/08 292/338
8,496,278 B2 * 7/2013 Lee ...................... E05C 19/004 292/339
9,644,396 B2 5/2017 Grow et al.
11,053,718 B2 7/2021 Finley
11,898,386 B1 * 2/2024 Mitchell ............... E05C 17/045
2004/0070217 A1 * 4/2004 Demlow ............... E05C 17/443 292/339
2005/0225099 A1 10/2005 Quarberg
2009/0102207 A1 4/2009 Kim
2009/0139050 A1 * 6/2009 Junkins .................. E05C 17/54 16/84
2009/0322473 A1 * 12/2009 Aliferis ................ E05B 47/026 70/91
2011/0140463 A1 * 6/2011 Nalepka ................. E05C 17/56 292/344
2012/0133517 A1 5/2012 Brausteiner et al.
2012/0235428 A1 9/2012 Blacklaws et al.
2013/0237193 A1 9/2013 Dumas et al.
2014/0375070 A1 12/2014 Hatton et al.
2015/0042109 A1 2/2015 Hatton et al.
2018/0148960 A1 * 5/2018 Finley .................. E05C 19/003

* cited by examiner

REMOVABLE, NON-INTRUSIVE, REMOTELY-CONTROLLED DOOR LOCKING APPARATUS

FIELD OF THE INVENTION

The present invention relates generally to the field of door locking devices. More specifically, the present invention is an apparatus adapted to provide resistance to a forced entry through the door.

BACKGROUND OF THE INVENTION

It may be desirable in many situations to increase the security on a door by, for example, installing a stronger lock or additional locks or bolts at additional locking points around the door. However, it is not always possible or convenient to make these types of permanent installations on a door, for example in a rented home or office, a hotel or hostel room, or in student accommodations.

Thus, in these situations it may be desirable to increase door security using non-blemishing or non-intrusive means. One well known method is to jam a chair under the door handle, but unless the chair is of proper size and construction, this will not hold the door for long. Also there is no means to remotely jam a chair under a door handle.

Another solution of jamming a door closed is by locating a bar at an angle between the door handle and the floor behind the door. While this is an improvement over the use of a chair, the connection between the bar and the door handle is prone to failure, and the bar can extend significantly beyond the door, presenting a tripping hazard. It is also bulky and awkward.

Another potential solution is presented in U.S. Pat. No. 11,053,718. It attaches the locking apparatus to the bottom of the door using a spring-loaded flap extended below the bottom of the door and an extendable strap that hooks around the door knob as shown in FIG. 1. The extendable strap relies on a spring to create tension that pulls the door locking device into the bottom of the door. The drawbacks of this approach are the two mechanical springs and the extendable strap. The mechanical springs add cost and can be unreliable. The extendable strap is bulky and unappealing. It also hooks around the doorknob and interferes with its feel and operation. Lastly, the extendable strap hooks around and settles at the lowest point of the door knob. This creates a gap between the extendable strap and the door that offsets the locking apparatus away from the door where it can now swing and bang against the door when the door is opened and closed.

Therefore, there is a need for a removable, remotely-controlled door locking apparatus that is compact, visually appealing, and non-intrusive in a way that it snugly fits against the door and does not leave any indication that is was previously installed when it is removed.

SUMMARY

An example embodiment of the present invention is directed to a removable, non-intrusive, remotely-controlled door locking apparatus. The apparatus includes a rear plate for attachment against a surface of a door using an adhesive substance, a flange connecting to the rear plate and extending underneath the door, and a removable cover for enclosing components on the rear plate. The apparatus further includes a DC-powered linear actuator enclosed within the removable cover and connected to the rear plate, at least one electronics module attached to the rear plate and configured to communicate wirelessly, and a foot attached to a lower end of the DC-powered linear actuator, the foot configured under actuator control to be extended in a lock state against a floor surface to secure the door or retracted in an unlock state, based on either a wireless signal received from a remote smart device or the state of a manual switch located on the apparatus to control the DC-powered linear actuator.

The apparatus further includes a force sensor attached to the rear plate for, upon receiving a wireless control signal by at least one electronics module from a user of the remote smart device placing the remotely-controlled door locking apparatus in a lock state, sensing a movement condition of the door while in its locked state such that the at least one electronics module generates an alarm signal locally at the door, and issuing a wireless alert message that is transmitted for display on the remote smart device of the user.

The apparatus further includes a battery level measurement circuit that measures the battery energy or voltage level and can send a wireless alert message with this information to the remote smart device of the user.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limitative of the example embodiments herein.

DETAIL DESCRIPTIONS OF THE INVENTION

Figure 1:
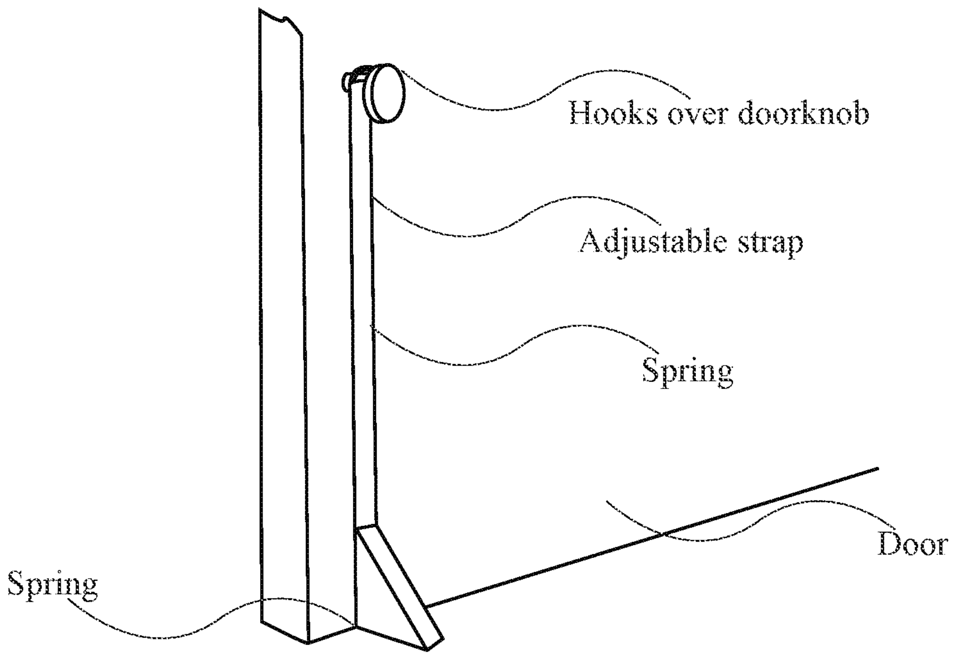
FIG. 1 (prior art)
FIG. 1 shows a perspective view of a removable, remotely-controlled door locking apparatus that was previously patented by the Applicant, showing an exploded view to demonstrate how all components may fit together.

All illustrations of the drawings are for the purpose of describing selected versions of the present invention and are not intended to limit the scope of the present invention.

In the following description, certain specific details are set forth in order to provide a thorough understanding of various example embodiments of the disclosure. However, one skilled in the art will understand that the disclosure may be practiced without these specific details. In other instances, well-known structures associated with manufacturing techniques have not been described in detail to avoid unnecessarily obscuring the descriptions of the example embodiments of the present disclosure. Unless the context requires otherwise, throughout the specification and claims that follow, the word “comprise” and variations thereof, such as “comprises” and “comprising,” are to be construed in an open, inclusive sense, that is, as “including, but not limited to.”

Reference throughout this specification to “one example embodiment” or “an embodiment” means that a particular feature, structure or characteristic described in connection with the embodiment is included in at least one embodiment. Thus, the appearances of the phrases "in one example embodiment" or "in an embodiment" in various places throughout this specification are not necessarily all referring to the same embodiment. Further, the particular features, structures or characteristics may be combined in any suitable manner in one or more example embodiments.

As used in this specification and the appended claims, the singular forms "a," "an," and "the" include plural referents unless the content clearly dictates otherwise, the plural referents including but not being limited to "one or more", "at least one", or "a plurality of". The term "or" is generally employed in its sense including "and/or" unless the content clearly dictates otherwise.

As used in the specification and appended claims, the terms "correspond," "corresponds," and "corresponding" are intended to describe a ratio of or a similarity between referenced objects. The use of "correspond" or one of its forms should not be construed to mean the exact shape or size. In the drawings, identical reference numbers identify similar elements or acts. The size and relative positions of elements in the drawings are not necessarily drawn to scale.

As used in the specification and appended claims, the term "smart device", "remote smart device" or "handheld smart device" is intended to refer to an electronic device, generally connected to other devices or networks via different wireless protocols such as Bluetooth, Bluetooth Low Energy (BLE), Zigbee, Thread, NFC, Wi-Fi, 802.15, etc., that can operate to some extent interactively and autonomously. Example smart devices may include but are not limited to mobile device smartphones such as ANDROID®, and IPHONE®-based systems, tablets, smart watches, smart bands, and smart key chains (or key fobs). The term smart device may also refer to a ubiquitous computing device, e.g., a device that exhibits some properties of ubiquitous computing including, although not necessarily, artificial intelligence.

Figure 2:
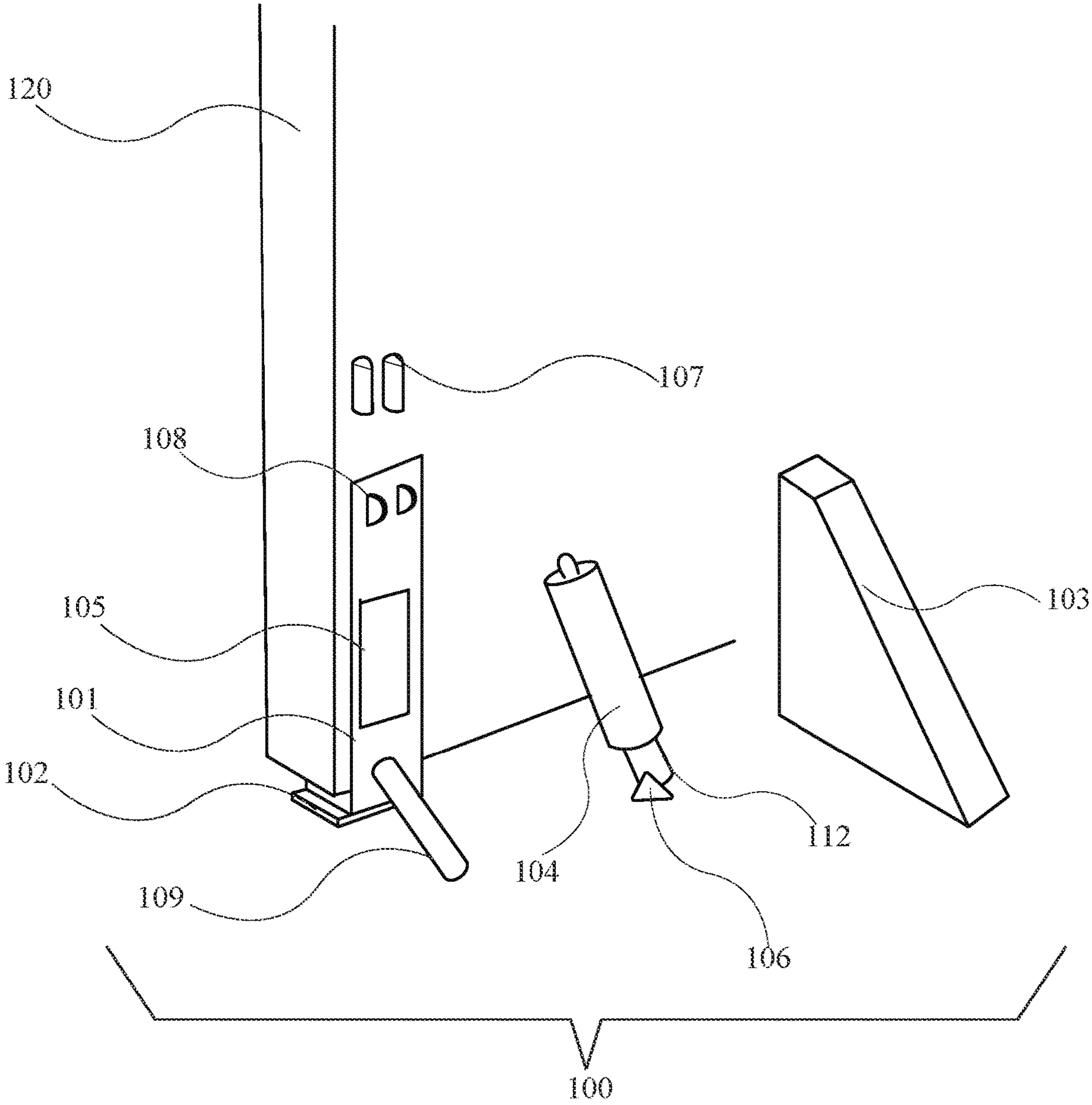
FIG. 2 shows a detailed embodiment of the removable, remotely-controlled door locking apparatus in accordance with the present invention.

Hereafter, the example embodiment is directed to a removable, non-intrusive, remotely-controlled door locking apparatus 100. Referring now to FIG. 2, the apparatus 100 includes a rear plate 101 for attachment against a surface of a door 120, and a removable cover 103 for enclosing selected electronic and mechanical components on the rear plate 101. An upper bracket 108 that supports a DC-powered linear actuator 104 enclosed within the cover 103 against the rear plate 101.

One or more electronics modules 105 are affixed on the rear plate 101. The electronics module 105 may include a controller 131 being a microcontroller or microprocessor, a radio transceiver 132 that provides wireless short-range RF communications with a remote smart device 140, actuator control circuitry 133, and a force sensor 134.

The actuator 104 includes a movable piston 112 which terminates at a lower end in a foot 106, which is attached to the piston 112. An optional lower bracket 109 connected to the rear plate 101, the lower bracket 109 supporting the lower end of actuator 104. The piston 112 with the foot 106 is configured under actuator 104 control to be extended in a lock state against a floor surface to secure the door or retracted in an unlock state, based on a wireless signal received from by the electronics module 105 from the remote smart device 140 to control the actuator 104. This is described in further detail below.

The removable cover 103 is attached to the rear plate 101 and includes a cutout for the piston 112 to be retracted or extended. As seen in FIG. 2, the removable cover may be of a shape and size completely encompass the remaining components, with the cutout being in the form of an expanded area designed to encompass the piston 112, accommodating the piston in both the extended and retracted positions. The cover can be removed for access to the electronics module 105 and the power source. The cover 103 may be constructed primarily from lightweight moldable plastic materials such as moldable plastic, e.g., as a single or multiple parts formed by an injection molding process.

There are many known injection molding machines for forming plastic injection molds, other plastic molding processes such as vacuum forming may be used. Alternatively, cover 103 may be formed using a metal casting process such as sand casting, die casting, or investment casting, for example.

Figure 3:
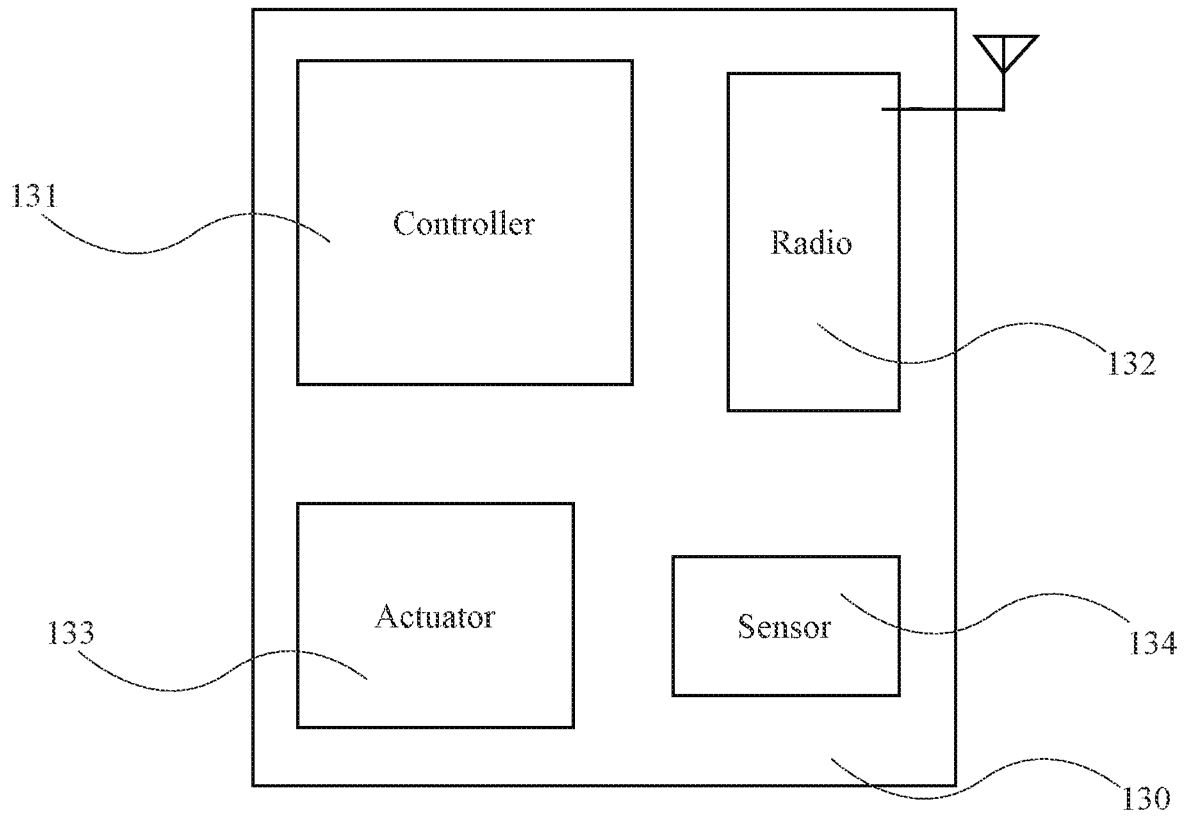
FIG. 3 shows a detailed diagram of the electronics module of the removable, remotely-controlled door locking apparatus in accordance with the present invention.

The electronic modules of apparatus 100 may best be shown in FIG. 3. Each of the electronics modules are attached to rear plate 101 and may include a printed circuit board (PCB) 130 with a microcontroller or microprocessor (referred to as the "controller") 131, radio transceiver 132, actuator control circuitry 133, and a force sensor 134. The controller 131 and radio transceiver 132 may be integrated together. In general, the controller 131 communicates wirelessly via the radio transceiver 132 with the remote smart device 140 and the controller 131 is configured to send control signals to other electronic devices on the rear plate 101.

The actuator control circuitry 133 in general controls the actuator 104 via a motor control signal, based on a control signal received via the controller 131 and radio transceiver 132 from the remote smart device 140. The force sensor 134 is adapted to sense a movement condition of the door 120, so as to generate an audible alarm and a message signal that is transmitted wirelessly via controller 131 and radio transceiver 132 to the smart device 140 for display to a user. The force sensor 134 may be a pressure sensor, accelerometer sensor, gyroscope sensor or other device that can detect a disturbance at the door and apparatus. Although not shown, the controller 131 may include a battery level measurement circuit that continually senses battery voltage. The apparatus 100 may send a signal that is transmitted wirelessly via the controller 131 and radio transceiver 132 to the smart device 140 that reports the battery energy or voltage level for display to a user. A signal may also be transmitted to display a warning or notification when the battery level measurement circuit senses a battery voltage that is below a designated threshold, the apparatus 100 sending a signal that is transmitted wirelessly via controller 131 and radio transceiver 132 to the smart device 140 for display to a user. In some embodiments, the battery level measurement circuit may comprise an under-voltage circuit.

In one example, each of the controller 131 and actuator control circuitry 133 may be embodied as a microcontroller (MCU), with the controller 131 and radio transceiver 132 being capable of wireless short-range RF communications with a smart device 140 using Bluetooth protocols. As is well known, a Bluetooth device works by using short-range RF waves (two devices communicating typically up to about 30 feet apart) instead of wires or cables to connect with a smart device. Bluetooth Low Energy (also known as BLE), a subset of the Bluetooth standard, may be used to reduce power consumption of the remotely-controlled locking device 100.

In another example, Zigbee, Thread, 802.15, wireless fidelity (Wi-Fi), or other proprietary communications may be used to wirelessly communicate between the controller 131 plus radio transceiver 132 of the remotely-controlled locking device 100 and the smart device 140.

As is well known in the art, electro-mechanical linear actuators convert rotary motion of a DC motor (such as a permanent magnet, stepped or brushless DC motor) into linear displacement. The electric motor is mechanically connected to rotate a lead screw, such as a ball-bearing lead screw for example. The lead screw has a continuous helical thread machined on its circumference running along the length (similar to the thread on a bolt). As such, when the actuator control circuitry 133 directs a current to the DC motor of the linear actuator 104, it causes rotary motion of its motor which in turn retracts (unlocked position of the removable remotely-controlled door lock) or extends the lead screw (locked position of the removable remotely-controlled door lock) and the movable piston 112. This in turn extends or retracts the foot 106 to place the apparatus 100 and door into either a locked or unlocked position, respectively.

The power supply 107 for apparatus 100 provides power to the electronics and DC motor of linear actuator 104 and may be in one example a battery pack comprising one or more alkaline batteries or rechargeable batteries. In one embodiment, the apparatus may include charging circuitry to recharge the batteries. Alternatively, the battery pack may be charged remotely via an external charger with wall power.

In an example, it is desirable that apparatus 100 be removably attachable against the surface of door 120 with minimal, if any, marring of the door. The Applicant has devised a non-intrusive and non-blemishing attachment means for apparatus 100. Namely, this may be accomplished by employing some type of adhesive substance meant only to support the weight of the apparatus 100 when the removable, remotely-controlled door lock is in the unlocked state. Examples of an adhesive substance include double-sided tape, very high bond (VHB) tape, or similar substances that will adhere to both the door and the rear plate 101 of the removable, remotely-controlled door locking apparatus 100. As such, the rear plate 101 of the removable, remotely-controlled door locking apparatus 100 fits snugly against the door. Furthermore, using an adhesive substance to attach the door locking apparatus to the door also prevents it from swinging and banging against the door when the door is opened and closed. The extended lip 102 provides added resistance when the removable, non-intrusive, remotely-controlled locking device is in the locked state.

Figure 4:
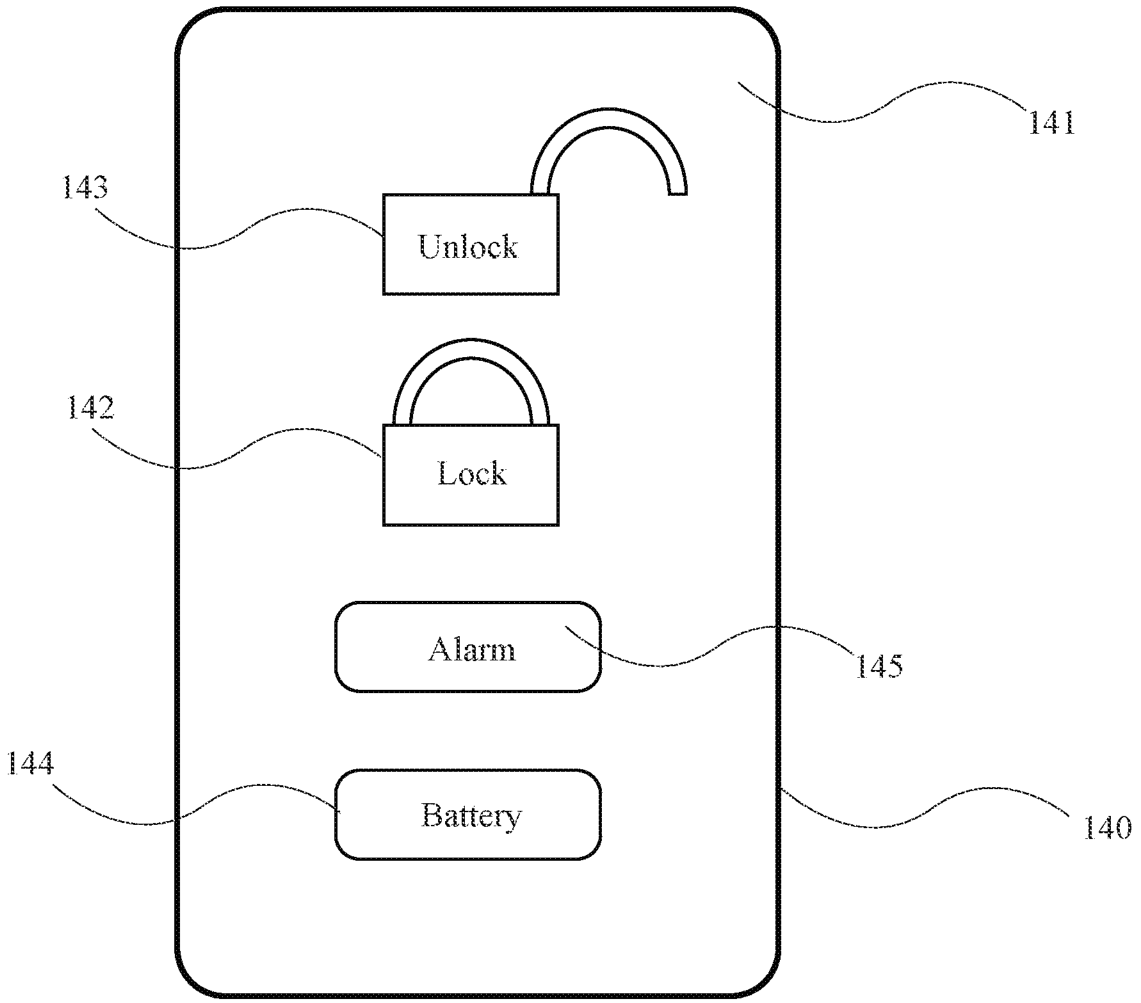
FIG. 4 shows an illustration of the application running on a smart device for remotely controlling the removable, remotely-controlled door locking apparatus in accordance with the present invention.

FIG. 4 is a front view of a smart phone to illustrate an exemplary display for an application to control apparatus 100 remotely. Before a user of the smart device 140 (here shown as a smartphone) can establish access to apparatus 100 for wireless communications, the devices must be paired, as is well known. Once paired for Bluetooth communications using short-range RF radio wave signals, the user may iterate a number of features of an application downloaded and installed on their smart device 140 to interface with apparatus 100. In the example of FIG. 4, the application might include the example graphical user interface (GUI) or display 141 as shown, with “Dashboard”, “Events” and “Contact Us” screens among other pages. In this specific example, the Dashboard screen view may present action icons to be tapped by the user, such as the “LOCK” icon 142, and the “UNLOCK” icon 143. Additionally, the user may be presented with a visual indicator or icon of low battery life 144 and the sensor alarm status 145, such as is shown in FIG. 4.

In general, once paired, wireless communications by a user of the smart device 140 to control apparatus 100 can be understood as follows. Upon selection or tapping the “LOCK” icon 142, the following operations occur: (i) a wireless signal is sent from the smart phone 140 to the radio transceiver 132 and controller 131; (ii) the wireless signal is communicated by the controller 131 to actuator control circuitry 133, the actuator control circuitry 133 in turn (iii) sends a control signal to the motor in the linear actuator 104 to cause the motor to rotate in one direction, which (iv) causes the piston 112 with foot 106 to travel downward to the floor surface to secure the door 120. In this “lock state”, any pressure or force moment exerted against the door 120 from the outside thereof will be sensed by force sensor 134, which in turn will cause an alert signal to be transmitted wirelessly from controller 131 and radio transceiver 132 to the smart device 140 for alert signal display thereon. Conversely, upon selection or tapping the “UNLOCK” icon 143 to change system mode, the reverse operations occur.

The smart device 140 has been described as being embodied as any of smartphones tablets, smart watches, smart bands and smart key chains, with a smartphone example having being shown in FIG. 4. Accordingly, a downloaded and installed application on smart device 140 may be used to remotely control apparatus 100.

The example embodiments having been described, it is apparent that such have many varied applications. For example, the example embodiments may be applicable but not limited to connection to various devices, structures and articles.

The present invention, in its various embodiments, configurations, and aspects, includes components, systems and/or apparatuses substantially as depicted and described herein, including various embodiments, sub-combinations, and subsets thereof. Those of skill in the art will understand how to make and use the present invention after understanding the present disclosure. The present invention, in its various embodiments, configurations, and aspects, includes providing devices in the absence of items not depicted and/or described herein or in various embodiments, configurations, or aspects hereof, including in the absence of such items as may have been used in previous devices, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures to those claimed, whether or not such alternate, interchangeable and/or equivalent structures disclosed herein, and without intending to publicly dedicate any patentable subject matter.

Although the invention has been explained in relation to its preferred embodiment, it is to be understood that many other possible modifications and variations can be made without departing from the spirit and scope of the invention.

I claim:

1. A remotely-controlled door locking apparatus comprising:

a rear plate for attachment against a surface of a door;

the rear plate being removably attached against the surface of the door using a non-marring adhesive;

a removable cover on the rear plate;

a DC-powered linear actuator enclosed within the removable cover and connected to the rear plate;

at least one electronics module attached to the rear plate;

the at least one electronics module further comprising a printed circuit board, a controller, actuator control circuitry, a radio transceiver, and a force sensor;

a foot attached to a lower end of the DC-powered linear actuator;

the foot to be extended in a lock state or retracted in an unlock state;

a power supply;

the power supply to provide electrical power to the at least one electronics module and the DC-powered linear actuator; and an extended lip.

2. The remotely-controlled door locking apparatus of claim 1, further comprising:

the DC-powered linear actuator comprising a movable piston; and the foot being attached to the lower end of the moveable piston.

3. The remotely-controlled door locking apparatus of claim 1, further comprising:

the radio transceiver being integrated with and in electronic communication with the controller; and the radio transceiver being adapted to communicate wirelessly with a remote smart device using short-range RF communications.

4. The remotely-controlled door locking apparatus of claim 1, further comprising:

the controller being a microcontroller;

the controller being adapted to communicate wirelessly via the radio transceiver and the remote smart device; and the controller being adapted to send control signals to any other electronic device located on the rear plate.

5. The remotely-controlled door locking apparatus of claim 1, further comprising:

the controller further comprising a battery level measurement circuit;

the battery level measurement circuit being adapted to sense a battery voltage; and the controller being adapted to send a signal to the remote smart device with the battery energy or voltage level obtained from the battery level measurement circuit.

6. The remotely-controlled door locking apparatus of claim 1, further comprising:

the actuator control circuitry being adapted to control the actuator via a motor control signal, based upon a user signal received from the controller, the controller receiving the user signal from the remote smart device.

7. The remotely-controlled door locking apparatus of claim 1, further comprising:

the force sensor being adapted to sense a movement condition of the door; and the controller being adapted to generate an audible alarm and a message signal when the force sensor senses a movement condition of the door, the audible alarm and message signal being transmitted to the remote smart device.

8. The remotely-controlled door locking apparatus of claim 1, further comprising:

the removable cover including a cutout for the movable piston, the cutout being adapted to allow the movable piston to retract and extend.

9. The remotely-controlled door locking apparatus of claim 1, further comprising:

the power supply comprising one or more rechargeable batteries; and the power supply further comprising a charging circuitry adapted to recharge the one or more rechargeable batteries via an external power source.

10. The remotely-controlled door locking apparatus of claim 1, further comprising:

an upper bracket;

the upper bracket supporting the dc-powered linear actuator; and the upper bracket being enclosed within the removable cover.

11. The remotely-controlled door locking apparatus of claim 1, further comprising:

a lower bracket; and the lower bracket being connected to the rear plate to support the lower end of the actuator.

12. The remotely-controlled door locking apparatus of claim 1, further comprising:

the remote smart device being adapted with a display, a lock icon, an unlock icon, a low battery life indicator, and a sensor alarm status indicator;

the controller further comprising an under-voltage circuit;

the under-voltage circuit being adapted to sense a battery voltage; and the controller being adapted to send a signal to the remote smart device upon the under-voltage circuit sensing a low battery voltage.

13. A remotely-controlled door locking apparatus comprising:

a rear plate for attachment against a surface of a door;

the rear plate being removably attached against the surface of the door using a non-marring adhesive;

a removable cover on the rear plate;

a DC-powered linear actuator enclosed within the removable cover and connected to the rear plate;

at least one electronics module attached to the rear plate;

a foot attached to a lower end of the DC-powered linear actuator;

the foot to be extended in a lock state or retracted in an unlock state;

a power supply;

an extended lip;

the DC-powered linear actuator comprising a movable piston;

the foot being attached to the lower end of the moveable piston;

the at least one electronics module further comprising a printed circuit board, a controller, actuator control circuitry, a radio transceiver, and a force sensor;

the removable cover including a cutout for the movable piston, the cutout being adapted to allow the movable piston to retract and extend;

the power supply comprising one or more rechargeable batteries;

the power supply to provide electrical power to the at least one electronics module and the DC-powered linear actuator;

the power supply further comprising a charging circuitry adapted to recharge the one or more rechargeable batteries via an external power source;

an upper bracket;

the upper bracket supporting the dc-powered linear actuator;

the upper bracket being enclosed within the removable cover;

a lower bracket;

the lower bracket being connected to the rear plate to support the lower end of the actuator;

the controller further comprising a battery level measurement circuit;

the battery level measurement circuit being adapted to sense a battery voltage; and the controller being adapted to send a signal to the remote smart device with the battery energy or voltage level obtained from the battery level measurement circuit; and the remote smart device being adapted with a display, a lock icon, an unlock icon, a low battery life indicator, and a sensor alarm status indicator.

14. The remotely-controlled door locking apparatus of claim 13, further comprising:

the radio transceiver being integrated with and in electronic communication with the controller; and the radio transceiver being adapted to communicate wirelessly with a remote smart device using short-range RF communications.

15. The remotely-controlled door locking apparatus of claim 13, further comprising:

the controller being a microcontroller;

the controller being adapted to communicate wirelessly via the radio transceiver and the remote smart device; and the controller being adapted to send control signals to any other electronic device located on the rear plate.

16. The remotely-controlled door locking apparatus of claim 13, further comprising:

the controller further comprising an under-voltage circuit;

the under-voltage circuit being adapted to sense a battery voltage; and the controller being adapted to send a signal to the remote smart device upon the under-voltage circuit sensing a low battery voltage.

17. The remotely-controlled door locking apparatus of claim 13, further comprising:

the actuator control circuitry being adapted to control the actuator via a motor control signal, based upon a user signal received from the controller, the controller receiving the user signal from the remote smart device.

18. The remotely-controlled door locking apparatus of claim 13, further comprising:

the force sensor being adapted to sense a movement condition of the door; and the controller being adapted to generate an audible alarm and a message signal when the force sensor senses a movement condition of the door, the audible alarm and message signal being transmitted to the remote smart device.

19. A remotely-controlled door locking apparatus comprising:

a rear plate for attachment against a surface of a door;

the rear plate being removably attached against the surface of the door using a non-marring adhesive;

a removable cover on the rear plate;

a DC-powered linear actuator enclosed within the removable cover and connected to the rear plate;

the DC-powered linear actuator comprising a movable piston;

at least one electronics module attached to the rear plate;

the at least one electronics module further comprising a printed circuit board, a microcontroller, actuator control circuitry, a radio transceiver, and a force sensor;

the radio transceiver being integrated with and in electronic communication with the controller;

the radio transceiver being adapted to communicate wirelessly with a remote smart device using short-range RF communications;

the controller being a microcontroller;

the controller being adapted to communicate wirelessly via the radio transceiver and the remote smart device;

the controller being adapted to send control signals to any other electronic device located on the rear plate;

the controller further comprising a battery level measurement circuit;

the battery level measurement circuit being adapted to sense a battery voltage;

the controller being adapted to send a signal to the remote smart device showing the battery energy or voltage level obtained from the battery level measurement circuit;

the actuator control circuitry being adapted to control the actuator via a motor control signal, based upon a user signal received from the controller, the controller receiving the user signal from the remote smart device;

the force sensor being adapted to sense a movement condition of the door;

the controller being adapted to generate an audible alarm and a message signal when the force sensor senses a movement condition of the door, the audible alarm and message signal being transmitted to the remote smart device;

the controller further comprising an under-voltage circuit;

the under-voltage circuit being adapted to sense a battery voltage;

the controller being adapted to send a signal to the remote smart device upon the under-voltage circuit sensing a low battery voltage;

a foot attached to a lower end of the movable piston;

the foot to be extended in a lock state or retracted in an unlock state;

the removable cover including a cutout for the movable piston, the cutout being adapted to allow the movable piston to retract and extend;

an extended lip;

a power supply;

the power supply comprising one or more rechargeable batteries;

the power supply to provide electrical power to the at least one electronics module and the DC-powered linear actuator;

the power supply further comprising a charging circuitry adapted to recharge the one or more rechargeable batteries via an external power source;

an upper bracket;

the upper bracket supporting the dc-powered linear actuator;

the upper bracket being enclosed within the removable cover;

a lower bracket;

the lower bracket being connected to the rear plate to support the lower end of the actuator; and the remote smart device being adapted with a display, a lock icon, an unlock icon, a low battery life indicator, and a sensor alarm status indicator.

* * * * *